Patented Oct. 15, 1940

2,217,701

UNITED STATES PATENT OFFICE 2,217,701

NUT BUTTER

Albert Musher, New York, N. Y., assignor to Musher Corporation, Elizabeth, N. J.

No Drawing. Application July 6, 1939,
Serial No. 283,063

15 Claims. (Cl. 99—128)

The present invention relates to nut butters, such as peanut butter, and it further relates to methods for making nut butters in such form that they will be more palatable, more spreadable, capable of being packaged in paper containers, and with further enhanced qualities.

It is among the objects of the present invention to prepare an improved peanut butter and other nut butters, which may be packaged in brick or substantially solid unit form, or which may be readily packaged in paper containers, wrappers, or cartons, and with a substantially reduced tendency towards oil separation.

It is also among the objects of this invention to prepare improved peanut butter and other nut butters which will have substantially better slicing qualities for use with sandwiches, etc., in many cases similar to the way cheese is sliced for this purpose.

A still further object is to provide improved, form sustaining nut butters which will have enhanced homogeneity and smoothness with less of the usual dry, mealy taste, with less tendency to sog into bread or other materials on which it is spread, and with less tendency to stick to the roof of the mouth when eaten.

Among the further objects is to produce nut butters of a new plastic quality, with entirely new qualities of spreadability, and in which the water soluble essences and flavors may be more fully developed, and into which nut butters there may be more readily incorporated other materials such as raisins, flaked coconut, nut meats, etc., without the usual tendency for such added materials to settle from their dispersed condition in the body of the nut butter.

Still further objects and advantages will appear from the more detailed description set forth below, it being understood, however, that this more detailed description is given by way of illustration and explanation only and not by way of limitation, since various changes therein may be made by those skilled in the art without departing from the scope and spirit of the present invention.

In accomplishing these objects various water bodier or gelatinizing materials are mixed with or intimately dispersed with the peanut butter or other nut butters. These water bodier, water absorbents, or water gelatinizing materials may be in a pasty or in a gelatinized form when they are added to the nut butter, or they may result in this pasty or gelatinized form after they have been admixed with the nut butter.

Examples of various gelatinizing materials are cornstarch, tapioca, pectin, oat flour, gelatin, various gums such as gum arabic, gum tragacanth, locust bean gum, and so forth.

These materials when in gelatinized form tend to solidify the peanut butter or minimize the oil separation properties of the nut butter, and tend to have the effect of binding together the ground mealy grains of the nut butter so as to provide a more homogeneous and smoother product.

In one embodiment of this invention, these water gelatinizing materials may be incorporated into the peanut butter in the form of a thick aqueous paste, or, in the form of a relatively thick rubbery jelly. This paste or jelly as may be made, for instance, with tapioca, cornstarch, potato starch or wheat starch, etc., may be readily formed by boiling these starch materials with desired quantities of aqueous materials such as water. Or, in the case of gums such as gum tragacanth, locust bean gum, etc., these gums may be mixed with water without heating, or if desired they may be boiled therein.

For many preferred purposes, a paste or jelly containing from 5% to 30% or 35% of starch or gelatinizing material, computed on the combined basis of the gelatinizing material and water present, is intimately mixed with peanut butter for instance, in such quantities that the solidified or plastic nut butter will contain, for example, under 6% or 7%, or under 10% of dry starch or gelatinizing material. This jelly or paste may be readily dispersed and mixed with peanut butter and will result in a peanut butter product of superior quality and flavor.

By the addition of a starch jelly, or other type of jelly or paste as herein described, it is possible to prepare the peanut butter in the form of a substantially solid brick or unit, and also, it is enabled to form a product which may be sliced into relatively smooth homogeneous slices for use on sandwiches or for similar uses.

Also, in accord with the procedures herein described, there is produced a substantially enhanced peanut butter or other nut butter with a substantially reduced tendency towards oil separation and further, there is produced a product with a substantially lessened dry or mealy taste as found in ordinary peanut butter. Consequently, there is less tendency towards sticking of the nut butter to the tongue or to the roof of the mouth.

Generally, the gelatinizing materials should be present in such quantity, and should be of such quality, that, when they are admixed with the water or aqueous material present, the resultant product, when cooled, and set, will be of a relatively heavy jelly, or pasty nature, or that it will be of a relatively form sustaining quality. This will better enable the retention of the nut oil therein, and likewise, will produce the smoothness and homogeneous quality for the peanut butter.

Further, the form sustaining or heavy bodied nature of the product is particularly utilized in the making of peanut butter bricks or units which will retain relatively their unity or brick formation, and which will have enhanced slicing qualities.

The nut butter products which are produced in accord with this invention may further be readily packaged in paper cartons, and in similar normally oil-seepable containers in which form it has heretofore not been possible to package peanut butter. The result will be that there will be a substantially lessened seepage of the oil through the container than heretofore obtained.

*Example I*

Although the starch, or other paste or jelly may be prepared in different ways with various formulas and procedures, one formula and procedure that has been found satisfactory is to mix 30 grams of cornstarch with about 150 grams of water which may have some lactic acid or vinegar or acetic acid or other aqueous materials mixed therein. Also, if desired, various flavoring materials as for instance about 50 grams of sugar and 20 grams of salt may be added if desired. These materials are mixed together thoroughly and are heated to a temperature of about 180° F., or until the mixture is thoroughly gelatinized. The starch then is in the form of a jelly, and will generally become heavier as the product cools. After this paste mixture has cooled, 30 grams is added to 150 grams of peanut butter and is intimately mixed therewith by the use of a mixing or beating equipment.

In place of the starch herein used, other bodier or gelatinizing materials such as gelatin, pectin, casein, or similar materials may be used in the proportions required for making them into the proper consistency, and in accord with the proper procedures that are necessary for properly gelatinizing these products as is known by those skilled in the art. Likewise various combinations of gelatinizing materials may be utilized as required.

To the resultant peanut butter product there may be added during, or after the procedure as herein described, pieces of chopped dates, flaked coconut, pulverized nuts, or other materials, which will then be distributed substantially throughout the nut butter and will remain substantially in this position, and will not tend to settle or segregate as is customary with the usual type of oily or liquid peanut butter.

If desired, the peanut butter and starch paste may be placed together at once, and then mixed. However, the generally preferred procedure for various embodiments is to add the paste material to the mixing bowl first and then add the peanut butter in relatively small proportions at a time, during the beating operation. This procedure has the tendency to better emulsify the oil in the peanut butter, and also there is a substantially reduced tendency towards lumpiness of the pasty material in the final mixed product. However, other procedures may be used, as required.

Following this operation, the nut butter product may be molded, or otherwise packaged, as desired.

It will be found however that this new peanut butter product is not of the usual oily nature of peanut butter and does not have the usual tendency towards oil seepage, and further, that it does not have the usual undesirable crumbly or sticky characteristics of mealy peanut butter.

*Example II*

In place of the starch used in the preceding example, other materials may be used as for instance, vegetable gums, which may enable the formation of the gelatinized material without cooking. For instance, a paste may be made by mixing together 100 grams of water or other aqueous materials with 8 grams of gum tragacanth, so as to form a thick paste. After this paste has been formed, 15 grams is mixed with 150 grams of peanut butter along the lines of the same method and procedure as described in Example I.

If desired, the quantity of the paste material may be increased or decreased in order to meet the desired requirements of the end product. Also, if desired the water or gum may be increased or decreased in the paste material as desired. The adjustment of the starch and water quantities of Example I may of course likewise be utilized to control the resultant end products, in the manner as specified herein for the combinations of the water and gum tragacanth mixture.

If desired, it is also possible to include in this admixture of the peanut butter and the paste, various flavoring materials as for instance vanilla extract, or essential oils, such as oil of lemon, or oil of orange, etc.

An alternative procedure in the making of the product in accord with this example, is to first mix the dry gum tragacanth thoroughly with the peanut butter, and then to add the water to the combined peanut butter and gum mixture. In this way, the gelatinization will take place upon the addition of the water to the combined mixture so as to result in the advantages herein disclosed.

Other examples follow:

|  | Example III | Example IV | Example V | Example VI |
|---|---|---|---|---|
| Peanut butter | 150 | 150 | 150 | 150 |
| Base #1 (see below) | 15 |  |  |  |
| Base #2 (see below) |  | 20 |  |  |
| Base #3 (see below) |  |  | 35 |  |
| Base #4 (see below) |  |  |  | 40 |

The above bases are made as follows:

|  | Base #1 | Base #2 | Base #3 | Base #4 |
|---|---|---|---|---|
| Water | 50 | 50 | 50 | 50 |
| Cider vinegar (4% acidity) | 50 | 50 | 50 | 50 |
| Powdered pectin | 10 | 20 |  |  |
| Powdered gelatin |  |  | 7 | 12 |

If desired, dispersing agents such as sugar may be used to more uniformly disperse the pectin or gelatin in the aqueous materials.

Instead of the peanut butter used in these examples, or for any of the embodiments of this invention, there may be used any type of relatively high oil containing material that is capable of being ground into a relatively oily, mealy material, or into a product of the general nature of peanut butter, or other nut or seed butters. Of course, the quantity and type of gelatinizable material and aqueous material, etc., and the methods used should be adjusted to the oil content, and other characteristics of the particular ground material that is utilized, and to the results it is desired to obtain.

As a further embodiment of this invention, some, or a large part of the oil from the nut butter may be removed so as to provide various chacteristics as, for instance, a harder or firmer brick, or so as to permit the use of a smaller amount of the paste or gelatinizing material, etc. However, when oil is removed, it generally should be removed from the nut butter before the nut butter is admixed with the paste.

In the carrying out of this invention, the amount, or speed, or nature of the agitation may be used to control the resultant product, in view of the fact that more violent beating, at various stages in the procedure, tends to release, to more or less of a degree, the oil that is held by the nut butter. It is generally preferred not to over-agitate the product so as not to produce a resultant oily end product.

Also, in the carrying out of this invention, the product should generally be made so that it will have present a sufficient amount of water gelatinizing or water absorbent material so that there is relatively no free water in the resultant nut butter product. A reasonable amount of water may be added to the nut butter product, for example, for the purpose of making the product thinner or more opaque, and, if necessary, additional gelatinizing material may be added if any free water appears.

In the carrying out of this invention, the paste material which is used may be added to the peanut butter or other nut butter preferably when the paste is cool. For some results, however, where it is desired, for example, to drive out some of the oil from the peanut butter mass, the paste may be utilized in hot condition for mixing with the nut butter.

The products that are produced in accord with this invention have a different structure than the usual nut butters. The paste or gelatinized material that is utilized apparently takes up or emulsifies the free oil of the nut butter and further this paste seems to encircle, encase, or bind together the ground nut particles so as to enable a more rigid structure, and with new qualities of spreadability, smoothness, etc.

Examples of various nut butters which may be used in place of peanut butter are for instance almond paste, or various other pastes or butters derived from pecans, pistachios, brazil nuts, cashew nuts, hazel nuts, ground or crushed oilseeds, as for instance, sesame seed and other materials such as for example, flaxseed cake, sesame press cake, and so forth.

The use of starch or gums in their gelatinized condition as described herein, provide entirely new results and are entirely different in result from the use of these materials in dry form, in view of the nature of dry starch, etc., to produce a mealy, or dry, grainy quality, which is not produced with starch or similar materials that have been gelatinized with water or other aqueous materials. The production of this smooth homogeneous quality in the final peanut butter product is of particular advantage in this invention.

A further advantage of the gelatinizing material in conjunction with nut butter is that, when it is desired to mix the peanut butter with aqueous materials, as for instance, milk, in order to produce various food drinks or combinations, the peanut butter will now more readily take in and retain these aqueous materials within it, so as to form a liquid more homogeneous product. This is a substantially enhanced improvement over regular peanut butter.

Another embodiment of this invention is to heat or otherwise treat the nut butter so as to have it exude or eliminate part, or a good portion of its oil content, and then to emulsify this free oil with the paste or gelatinized material, and then to mix this combination with the nut butter from which the oil was removed. The free oil of the nut butter is thereby placed in a dispersed form in the paste for admixture with the original nut butter. If desired, a plastic or hard fat may be mixed with the oil and paste combination prior to admixture with the nut butter so as to form a water-in-oil emulsion-like product.

In order to further enhance the nut butter, a dry meal or flour material as for instance peanut flour, wheat flour, oat flour, or other dry, powdery materials may be added to the peanut butter itself or to the mixture of the peanut butter and the gelatinized material. This still further retards oil seepage and provides more body for the product. Unexpectedly, however, the condition of this flour does not produce the dryness or mealiness in the taste of the product to the extent that would be expected. This is now due to the water gelatinized paste or jelly material that is present.

Still further, the use of the flour to the product, as for instance, to the extent of 10 grams of peanut flour or oat flour to 90 grams of the product of Example I, and the thorough mixing and beating therein, produces a whiteness or opaqueness to the peanut butter which is in many cases desired.

A further advantage of the present invention is that with the water present in the jelly or paste material, there is a strong tendency to bring out the water soluble flavors of the peanut butter, and thereby there is developed even a stronger flavor of the particular peanut butter or nut butter as compared with the original nut butter itself.

A further embodiment of this invention that produces entirely new and unusual results is that an airifying agent, as for instance, egg albumen, or a fatty, or other airifying materials, may be used in order to enable the whipping of air into the nut butter product, which heretofore has been impossible. This aeration that is produced results in even further smoothness, and it results in an opaqueness or whiteness in the product, and also, it results in other qualities that are of material advantage. This airifying agent may be added and thoroughly mixed therein in the amounts required. At times it is desirable, in order to enhance the airifying quality, and particularly where the airifying agent is a water soluble product, to add an additional quantity of water to the nut butter product. This will generally enable a better aerated product.

A particularly advantageous procedure for this airifying embodiment in conjunction with nut butters, comprises the use of plastic, hard fat, or other fatty airifying materials.

*Example VII*

For instance, an aerated nut butter with entirely new and enhanced qualities may be produced by first making a base material consisting of 8 grams of powdered gum tragacanth, 100 grams of water, and with 8 grams of sugar in order to facilitate proper dispersion of the tragacanth in the water. These materials are then thoroughly mixed together so as to make a paste. Thereupon, 15 grams of this paste is mixed well with 150 grams of peanut butter, and then 45 grams of hydrogenated cottonseed oil of about 105° F. melting point is added, and mixed thoroughly therein so as to produce the aeration and opaqueness. Generally, the fat and paste should be mixed together first and the combination then mixed with the peanut butter.

As a variation of this example, there may be used, for example, 150 grams of peanut butter, 30 grams of the paste and 30 grams of the fat.

An unusual quality that is produced in the peanut butter of this invention is that edible acids, as for instance, vinegar, citric acid, tartaric acid, when added to the peanut butter product do not seem to give the peanut butter product the acid taste that would be expected, even when used in substantial quantities. In fact, quite to the contrary, the use of these acid materials seems to materially enhance the flavor of the peanut butter product and it seems to bring out the peanut butter flavor in a substantial way. Apparently, the acidity of these edible acids seem to counterbalance other flavors in the peanut butter so that there is not present the acid flavor that is expected, but, as disclosed herein, the peanut flavor itself is substantially enhanced. For example, in Example I, a cider vinegar of 4% acid content may be used, for example, in the amount of 20% to 25% based upon the quantity of aqueous material that is used.

What I claim is:

1. A nut butter composition comprising nut butter and a gelatinized water-thickener, said nut butter having at least part of its oil removed therefrom.

2. A nut butter composition comprising nut butter and a gelatinized water-thickener, said gelatinized water-thickener having dispersed therein at least a portion of the oil of the nut butter so as to result in relatively reduced oil seepage quality.

3. A nut butter composition comprising nut butter and a gelatinized water-thickener, said nut butter composition being in an aerated condition.

4. A food composition comprising nut butter, an aqueous material, and a water gelatinizable material, said water gelatinizable material being in a gelatinized condition.

5. A food composition comprising ground oil-seeds, an aqueous material, and a water gelatinizable material, said water gelatinizable material being in a gelatinized condition and dispersed throughout the food composition.

6. A nut butter composition comprising nut butter and a gelatinized water-thickener, said composition having an edible powdery flour-like material intimately mixed therewith.

7. A method of producing an enhanced nut butter product said method comprising forming a paste with an aqueous material and water thickener, and then intimately mixing said paste with the nut butter with a minimum amount of agitation.

8. A method of producing an enhanced nut butter product, said method comprising mixing with the nut butter a water gelatinizable material, and then adding an aqueous material to this combination, and then mixing and treating this combination so as to gelatinize the water-gelatinizable material that is present within the nut butter composition.

9. A food composition comprising nut butter, an aqueous material, and a water gelatinizable material, said water gelatinizable material being in a gelatinized condition, and said food composition containing an airifying agent and air therein.

10. A food composition comprising nut butter, an aqueous material, and a water gelatinizable material, said water gelatinizable material being in a gelatinized condition, and said food composition containing an edible acid therein.

11. The food composition of claim 6, the nut butter being peanut butter.

12. The food composition of claim 6, the water gelatinizable material being an edible starch.

13. The food composition of claim 6, the nut butter being peanut butter, said peanut butter being present in major proportion in the food composition, and the water gelatinizable material being an edible starch.

14. The food composition of claim 6, the water gelatinizable material being a vegetable gum.

15. The food composition of claim 7, the oil seeds being sesame seeds.

ALBERT MUSHER.

CERTIFICATE OF CORRECTION.

Patent No. 2,217,701.   October 15, 1940.

ALBERT MUSHER.

It is hereby certified that error appears in the printed specification of the above numbered patent requiring correction as follows: Page 4, second column, lines 39, 41, 43 and 48, claims 11 to 14 inclusive, for the claim reference numeral "6" read --4--; line 50, claim 15, for the claim reference numeral "7" read --5--; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.